US012700063B2

(12) United States Patent
Raymond et al.

(10) Patent No.:  US 12,700,063 B2
(45) Date of Patent:        Aug. 4, 2026

(54) METHODS, APPARATUSES, SYSTEMS AND COMPUTER-READABLE MEDIUMS FOR CORRECTING ECHO PLANAR IMAGING ARTIFACTS

(71) Applicants: The Regents of the University of California, Oakland, CA (US); Siemens Healthineers AG, Forchheim (DE)

(72) Inventors: Catalina Raymond, Los Angeles, CA (US); Benjamin Ellingson, Redondo Beach, CA (US); Jingwen Yao, Los Angeles, CA (US); Thorsten Feiweier, Poxdorf (DE); Bryan Clifford, Malden, MA (US); Xiaodong Zhong, Oak Park, CA (US)

(73) Assignees: Siemens Healthineers AG, Forchheim (DE); The Regents of the University of California, Oakland, CA (US)

( * ) Notice: Subject to any disclaimer, the term of this patent is extended or adjusted under 35 U.S.C. 154(b) by 352 days.

(21) Appl. No.: 18/345,103

(22) Filed: Jun. 30, 2023

(65) Prior Publication Data

US 2025/0005715 A1      Jan. 2, 2025

(51) Int. Cl.
*G06T 5/50*            (2006.01)
(52) U.S. Cl.
CPC ...... *G06T 5/50* (2013.01); *G06T 2207/10081* (2013.01); *G06T 2207/10088* (2013.01); *G06T 2207/20081* (2013.01); *G06T 2207/20084* (2013.01); *G06T 2207/20212* (2013.01); *G06T 2207/30008* (2013.01); *G06T 2207/30016* (2013.01)

(58) Field of Classification Search
CPC ............ G06T 5/50; G06T 2207/10081; G06T 2207/10088; G06T 2207/20081; G06T 2207/20084; G06T 2207/20212; G06T 2207/30008; G06T 2207/30016; G06T 5/60; G06V 10/774–7753; G06N 3/08–0985; G06F 18/214–2155; G06F 7/023; G06F 40/16
See application file for complete search history.

(56) References Cited

U.S. PATENT DOCUMENTS

| | | | | |
|---|---|---|---|---|
| 10,712,416 B1 * | 7/2020 | Sandino | ................. | G06N 3/045 |
| 11,714,152 B2 * | 8/2023 | Akcakaya | ................ | G06N 3/08 |
| | | | | 382/131 |
| 12,174,281 B2 * | 12/2024 | Solomon | ................ | A61B 5/055 |
| 2019/0377047 A1 * | 12/2019 | Chen | .................. | G01R 33/5608 |

(Continued)

OTHER PUBLICATIONS

Yang, Qinqin, et al. "Model-based synthetic data-driven learning (MOST-DL): Application in single-shot T 2 mapping with severe head motion using overlapping-echo acquisition." IEEE Transactions on Medical Imaging 41.11 (2022): 3167-3181 (Year: 2022).*

(Continued)

*Primary Examiner* — Atiba O Fitzpatrick

(57) ABSTRACT

A method for correcting echo planar imaging artifacts includes correcting at least one echo planar imaging artifact in an image to obtain a correct image. A trained neural network is used to correct the at least one echo planar imaging artifact. The image is obtained through echo planar imaging.

12 Claims, 11 Drawing Sheets
(2 of 11 Drawing Sheet(s) Filed in Color)

(56) References Cited

U.S. PATENT DOCUMENTS

| | | | |
|---|---|---|---|
| 2020/0300954 A1* | 9/2020 | Sharma | G01R 33/4835 |
| 2021/0165061 A1* | 6/2021 | Koerzdoerfer | G01R 33/56572 |
| 2021/0272335 A1* | 9/2021 | Huang | G06T 7/0012 |
| 2022/0026516 A1* | 1/2022 | Guidon | G01R 33/565 |
| 2023/0136320 A1* | 5/2023 | Solomon | G01R 33/56509 324/307 |
| 2023/0186532 A1* | 6/2023 | Schuelke | G01R 33/543 324/309 |
| 2023/0236271 A1* | 7/2023 | Fessler | G06T 5/70 324/309 |
| 2025/0251478 A1* | 8/2025 | Gessert | G06T 5/70 |

OTHER PUBLICATIONS

Lee, J., Han, Y., Ryu, J., Park, J., & Ye, J. C. (2019). k-Space deep learning for reference-free EPI ghost correction. Magnetic Resonance in Medicine.

Chen, N., & Wyrwicz, A. M. (2004). Removal of EPI Nyquist Ghost Artifacts with Two-Dimensional Phase Correction. Magnetic Resonance in Medicine.

Fischer, H., & Ladebeck, R. (1998). Echo-Planar Imaging Image Artifacts.

Rong, W., Li, Z., Zhang, W., & Sun, L. (2014). An improved Canny Edge Detection Algorithm.

Ozan Oktay, Jo Schlemper, Loic Le Folgoc, Matthew Lee, Mattias Heinrich, Kazunari Misawa, Kensaku Mori, Steven McDonagh, Nils Y Hammerla, Bernhard Kainz, Ben Glocker, and Daniel Rueckert, (2018) Attention U-Net: Learning Where to Look for the Pancreas.

Arjovsky, M., Chintala, S., & Bottou, L. (2017). Wasserstein Generative Adversarial Networks. In International Conference on Machine Learning.

Ledig, C., Theis, L., Huszar, F., Caballero, J. a. R., Cunningham, A., Acosta, A., Aitken, A., Tejani, A., Totz, J., Wang, Z., & Shi, W. (2017). Photo-Realistic Single Image Super-Resolution Using a Generative Adversarial Network.

Zijlstra, F., Bouwman, J. G., Braskute, I., Viergever, M. A., & Seevinck, P. R. (2017). Fast Fourier-Based Simulation of Off-Resonance Artifacts in Steady-State Gradient Echo MRI Applied to Metal Object Localization. Magnetic Resonance in Medicine.

Kawamura, M., Tamada, D., Funayama, S., Kromrey, M., Ichikawa, S., Onishi, H., & Motosugi, U. (2021). Accelerated Acquisition of High-resolution Diffusion-weighted Imaging of the Brain with a Multi-shot Echo-planar Sequence: Deep-learning-based Denoising. Magnetic Resonance in Medical Sciences.

Bouwman, J. G., & Bakker, C. J. (2012). Alias Subtraction More Efficient Than Conventional Zero-Padding in the Fourier-Based Calculation of the Susceptibility Induced Perturbation of the Magnetic Field in MR. Magnetic Resonance in Medicine.

Poser, B. A., Barth, M., Goa, P. E., Deng, W., & Stenger, V. A. (2013). Single-Shot Echo-Planar Imaging with Nyquist Ghost Compensation: Interleaved Dual Echo With Acceleration (IDEA) Echo-Planar Imaging (EPI). Magnetic Resonance in Medicine.

Ellingson et al. A. E. (2015). Consensus recommendations for a standardized Brain Tumor Imaging Protocol in clinical trials. Neuro-Oncology.

Johnson, J. C., Alahi, A., & Fei-Fei, L. (2016). Perceptual Losses for Real-Time Style Transfer and Super-Resolution. Department of Computer Science, Stanford University.

Alom, Z., Yakopcic, C., Taha, T. M., & Asari, V. K. (2018). Recurrent Residual Convolutional Neural Networks based on U-Net (R2U-Net) for Medical Image Segmentation.

Wang, J., Sun, K., Cheng, T., Jiang, B., Deng, C., Zhao, Y., Liu, D., Mu, Y., Tan, M., Wang, X., Liu, W., & Xiao, B. (2021). Deep High-Resolution Representation Learning for Visual Recognition. IEEE Transactions on Pattern Analysis and Machine Intelligence.

Ronneberger, O., Fischer, P., & Brox, T. (2015). U-Net: Convolutional Networks for Biomedical Image Segmentation.

Isola, P., Zhu, J., Zhou, T., & Efros, A. A. (2017). Image-to-Image Translation with Conditional Adversarial Networks.

Bruder, H., Fischer, H., Reinfelder, H., & Schmitt, F. (1992). Image Reconstruction for Echo Planar Imaging with Nonequidistant k-Space Sampling. Magnetic Resonance in Medicine.

Truong, T., Clymer, B. D., Chakeres, D. W., & Schmalbrock, P. (2002). Three-dimensional numerical simulations of susceptibility-induced magnetic field inhomogeneities in the human head. Magnetic Resonance Imaging.

Bilgic, B., Chatnuntawech, I., Manhard, M. K., Tian, Q., Liao, C., Iyer, S., Cauley, S. F., Huang, S. Y., Polimeni, J. R., Wald, L. L., & Setsompop, K. (2019). Highly accelerated multishot echo planar imaging through synergistic machine learning and joint reconstruction. Magnetic Resonance in Medicine.

Buonocore, M. H., & Gao, L. (1997). Ghost Artifact Reduction for Echo Planar Imaging Using Image Phase Correction. Magnetic Resonance in Medicine.

* cited by examiner

10

400

S402

S404

```
        ┌─────────────┐
        │    Start     │
        └──────┬──────┘
               │
               ▼
   ┌────────────────────────┐
   │ Use a B0 map to generate a │ ─── S602
   │ displacement field based on │
   │ sequence acquisition paramters │
   └────────────┬───────────┘
               │
               ▼
   ┌────────────────────────┐
   │ Generate an artifacted EPI │
   │   image by applying the    │ ─── S604
   │  displacement field to the │
   │      training image        │
   └────────────┬───────────┘
               │
               ▼
        ┌─────────────┐
        │     End      │
        └─────────────┘
```

FIG. 6

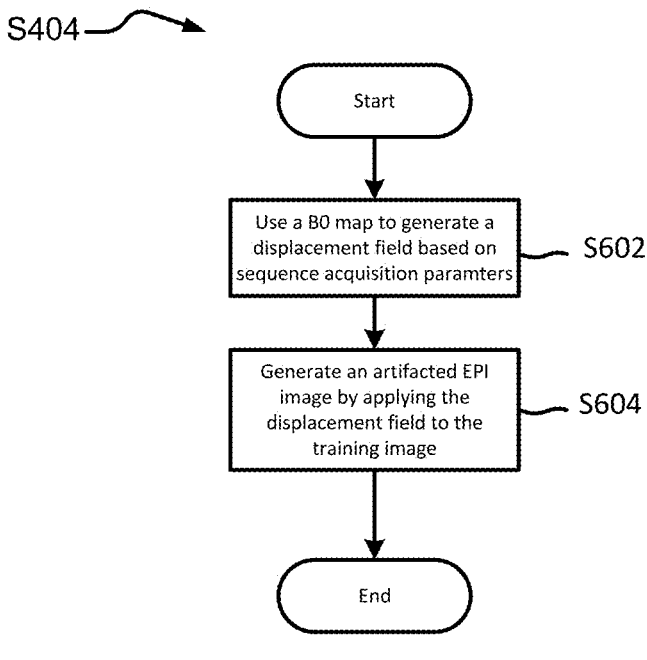

FIG. 7

S402
S404
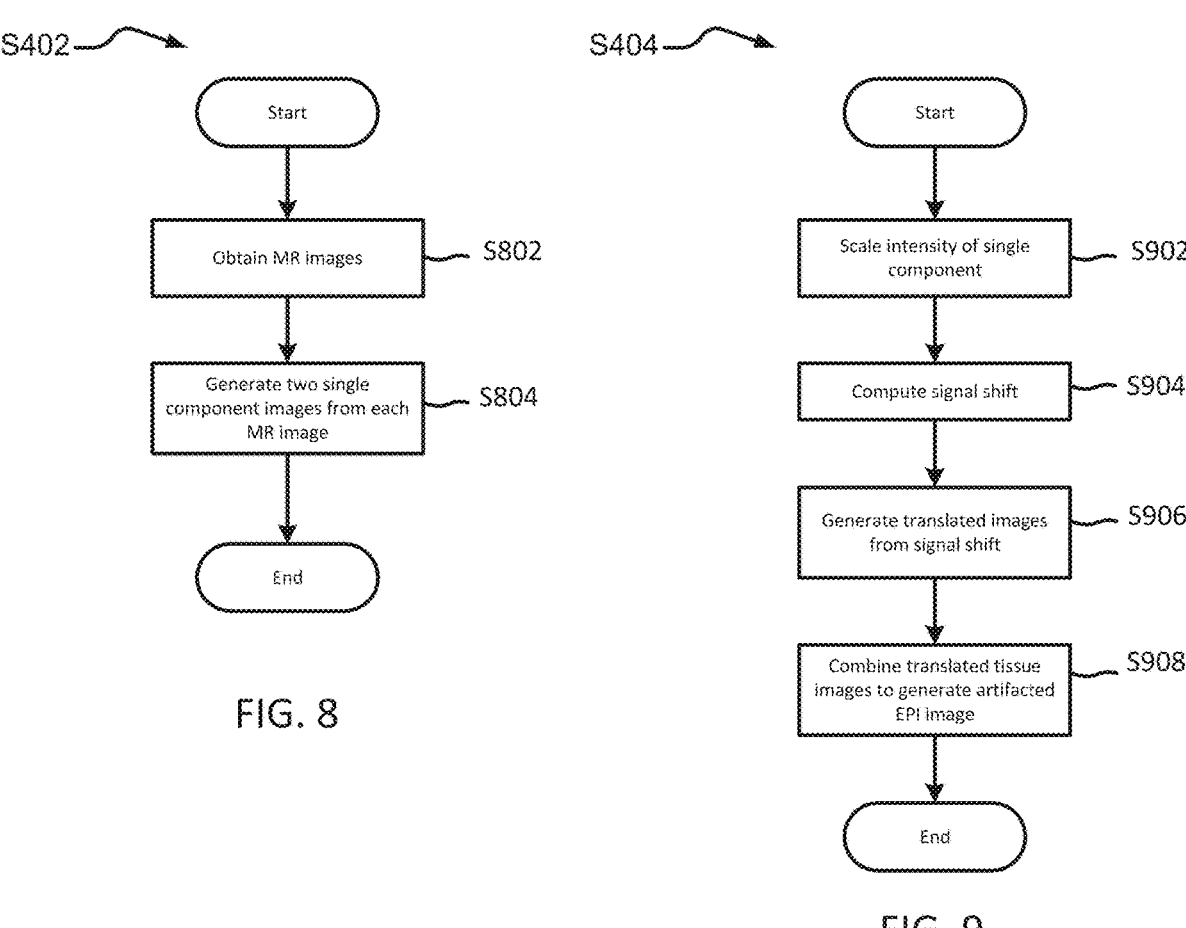
FIG. 8
FIG. 9
1000
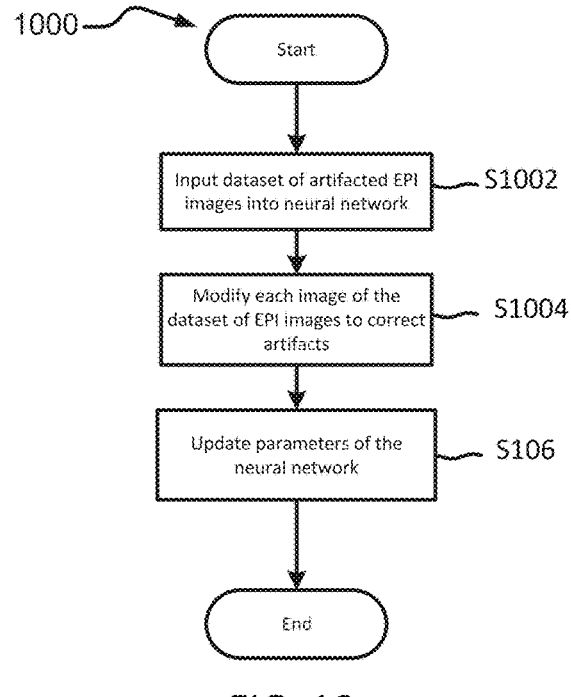
FIG. 10

1100

METHODS, APPARATUSES, SYSTEMS AND COMPUTER-READABLE MEDIUMS FOR CORRECTING ECHO PLANAR IMAGING ARTIFACTS

TECHNICAL FIELD

Example embodiments relate to correcting echo planar imaging artifacts.

BACKGROUND

Echo planar imaging is a widely used pulse sequence due to its relatively high speed of image acquisition. Due to the k-space acquisition nature of echo planar imaging, possible system imperfections and other physics-related causes, acquired images may have imaging artifacts that hinder the acquired images.

SUMMARY

In at least one example embodiment, a method of correcting echo planar imaging artifacts is described. The method may include correcting, using a trained neural network, at least one echo planar imaging artifact in an image to obtain a corrected image.

At least one other example embodiment provides a device for performing the method of correcting echo planar imaging artifacts. The device may include at least one processor and memory storing computer readable instructions that, when executed by the at least one processor, cause the device to perform the method of correcting echo planar imaging artifacts.

At least one other example embodiment provides a device for correcting echo planar imaging artifacts. The device may include at least one processor and at least one memory storing computer readable instructions that, when executed by the at least one processor, cause the device to correct, using a trained neural network, at least one echo planar imaging artifact in an image to obtain a corrected image.

At least one other example embodiment provides a non-transitory computer readable medium storing computer readable instructions that, when executed by one or more processors of a system, cause the system to perform a method of correcting echo planar imaging artifacts. The method may include correcting, using a trained neural network, at least one echo planar imaging artifact in an image to obtain a corrected image.

At least one other example embodiment provides a device for correcting echo planar imaging artifacts. The device may include means for correcting, using a trained neural network, at least one echo planar imaging artifact in an image to obtain a corrected image.

In at least one example embodiment, the image may be obtained through echo planar imaging.

In at least one example embodiment, the trained neural network may be trained using a dataset including artifacted echo planar images. In at least one example embodiment, the dataset of artifacted echo planar images may include high-resolution images including at least one simulated echo planar imaging artifact. In at least one example embodiment, the high-resolution images may be modified to include the at least one simulated echo planar imaging artifact. In at least one example embodiment, the dataset of artifacted echo planar images may include at least one artifacted image with at least one simulated echo planar imaging artifact. In at least one example embodiment, the dataset of artifacted images may be generated by altering equipment to obtain at least one artifacted image with at least one deliberately induced echo planar imaging artifact.

In at least one example embodiment, the at least one echo planar imaging artifact may include at least one of a B0 susceptibility artifact, a chemical shift artifact, a Rician noise artifact, a Nyquist artifact, or a Gibbs ringing artifact.

At least one other example embodiment provides a method of generating a dataset of artifacted echo planar images. In at least one example embodiment, the method may include obtaining a dataset of images and modifying images of the dataset of images to obtain artifacted echo planar images.

At least one other example embodiment provides a device for performing the method of generating a dataset of artifacted echo planar images. The device may include at least one processor and memory storing computer readable instructions that, when executed by the at least one processor, cause the device to perform the method of generating a dataset of artifacted echo planar images.

At least one other example embodiment provides a device for generating a dataset of artifacted echo planar images. The device may include at least one processor and at least one memory storing computer readable instructions that, when executed by the at least one processor, cause the device to obtain a dataset of images, and to modify images of the dataset of images to obtain artifacted echo planar images.

At least one other example embodiment provides a non-transitory computer readable medium storing computer readable instructions that, when executed by one or more processors of a system, cause the system to perform a method of generating a dataset of artifacted echo planar images. The method may include obtaining a dataset of images and modifying images of the dataset of images to obtain artifacted echo planar images.

At least one other example embodiment provides a device for generating a dataset of artifacted echo planar images. The device may include means for obtaining a dataset of images, and means for modifying images of the dataset of images to obtain artifacted echo planar images.

In at least one example embodiment, the modifying the images of the dataset of images may include altering the images of the dataset of images to include simulated echo planar imaging artifacts. In at least one example embodiment, the simulated echo planar imaging artifacts may include at least one of B0 susceptibility artifacts, chemical shift artifacts, Rician noise artifacts, Nyquist artifacts, or Gibbs ringing artifacts.

In at least one example embodiment, the obtaining the dataset of images may include: generating a computed tomography (CT) template; registering a training image to the CT template; generating a bone map, a tissue map, and an air map from the training image and the CT template; and generating a field map based on the bone map, the tissue map, the air map, and a training image scanner orientation. In at least one example embodiment, the modifying the images of the dataset of images to obtain synthetic echo planar images may include applying a B0 artifact to at least one of the images using a physics model based on sequence acquisition parameters. Applying the B0 artifact to at least one of the images may include using the field map to generate a displacement field based on the sequence acquisition parameters and generating an artifacted echo planar image by applying the displacement field to the training image.

In at least one example embodiment, the obtaining the dataset of images may include obtaining magnetic resonance (MR) images and generating at least two single component images from each of the MR images. In at least one example embodiment, each of the at least two single component images may include a single component. In at least one example embodiment, the single component may be brain matter or lipids and bone. In at least one example embodiment, the modifying the images of the dataset of images to obtain synthetic echo planar images may include, for each of the at least two single component images, scaling an intensity of the single component, computing a signal shift, and generating a translated tissue image using the signal shift. In at least one example embodiment, the signal shift may be computed based on sequence acquisition parameters and a Larmor frequency of the single component relative to brain tissue. In at least one example embodiment, the modifying the images of the dataset of images may further include combining the translated tissue images to generate an arti-facted echo planar image.

At least one other example embodiment provides a method of training a neural network to correct echo planar imaging artifacts. The method may include: inputting a dataset of artifacted echo planar images into a neural net-work; modifying, via the neural network, each image of the dataset of artifacted echo planar images to remove at least one synthetic echo planar imaging artifact; and updating one or more parameters of the neural network based on the modified images of the dataset of artifacted single-shot echo planar images. In at least one example embodiment, each artifacted echo planar image may include at least one synthetic echo planar imaging artifact.

At least one other example embodiment provides a device for performing the method of training a neural network to correct echo planar imaging artifacts. The device may include at least one processor and memory storing computer readable instructions that, when executed by the at least one processor, cause the device to perform the method of train-ing a neural network to correct echo planar imaging artifacts.

At least one other example embodiment provides a device for training a neural network to correct echo planar imaging artifacts. The device may include at least one processor and at least one memory storing computer readable instructions that, when executed by the at least one processor, cause the device to input a dataset of artifacted echo planar images into a neural network, modify, via the neural network, each image of the dataset of artifacted echo planar images to remove at least one synthetic echo planar imaging artifact, and update one or more parameters of the neural network based on the modified images of the dataset of artifacted single-shot echo planar images. In at least one example embodiment, each artifacted echo planar image may include at least one synthetic echo planar imaging artifact.

At least one other example embodiment provides a non-transitory computer readable medium storing computer readable instructions that, when executed by one or more processors of a system, cause the system to perform a method of training a neural network to correct echo planar imaging artifacts. The method may include inputting a dataset of artifacted echo planar images into a neural net-work, modifying, via the neural network, each image of the dataset of artifacted echo planar images to remove at least one synthetic echo planar imaging artifact, and updating one or more parameters of the neural network based on the modified images of the dataset of artifacted single-shot echo planar images. In at least one example embodiment, each artifacted echo planar image may include at least one synthetic echo planar imaging artifact.

At least one other example embodiment provides a device for training a neural network to correct echo planar imaging artifacts. The device may include means for inputting a dataset of artifacted echo planar images into a neural net-work, means for modifying, via the neural network, each image of the dataset of artifacted echo planar images to remove at least one synthetic echo planar imaging artifact, and means for updating one or more parameters of the neural network based on the modified images of the dataset of artifacted single-shot echo planar images. In at least one example embodiment, each artifacted echo planar image may include at least one synthetic echo planar imaging artifact.

In at least one example embodiment, the method may further include validating the neural network with a valida-tion dataset of artifacted echo planar images. In at least one example embodiment, each artifacted echo planar image, in the validation dataset of artifacted echo planar images, may include at least one synthetic echo planar imaging artifact.

In at least one example embodiment, the dataset of artifacted echo planar images may include images having at least one simulated echo planar imaging artifact. In at least one example embodiment, the dataset of artifacted echo planar images may be obtained by modifying each image of a dataset of images to include at least one simulated echo planar imaging artifact. In at least one example embodiment, the at least one simulated echo planar imaging artifact may include at least one of a B0 susceptibility artifact, a chemical shift artifact, a Rician noise artifact, a Nyquist artifact, or a Gibbs ringing artifact.

In at least one example embodiment, the neural network may be trained using a combination of supervised and unsupervised learning.

In at least one example embodiment, the neural network may employ at least one of a generative adversarial network (GAN) (e.g., Pix2Pix) a multiscale generator model archi-tecture (e.g., UNet), a GAN multiscale generator model with attention architecture, a GAN generator model with atten-tion and with recurrent convolutional layers architecture (e.g., R2UNet). In at least one example embodiment, the loss metric that the network is trained to minimize may include at least one of a discriminant loss, Wasserstein loss, or a loss computed using a pretrained (neural network) model (e.g., perceptual loss).

In at least one example embodiment, the neural network may be trained with an iterative fine-tuning approach.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Other objects and features of the present invention will become apparent from the following detailed description considered in conjunction with the accompanying drawings. The drawings, however, are only examples and schemat-ics solely for the purpose of illustration and do not limit the present invention. In the drawings:

FIG. 6 is a flow chart of an example embodiment of a method of modifying images of the dataset of images at S404 in FIG. 4.

FIG. 7 is a collection of example B0 maps generated according to an example embodiment at S508 in FIG. 5.

FIG. 8 is a flow chart of another example embodiment of a method of obtaining a dataset of images at S402 in FIG. 4.

FIG. 9 is a flow chart of another example embodiment of a method of modifying images of the dataset of images at S404 in FIG. 4.

FIG. 10 is a flow chart of a method of training a neural network to correct EPI artifacts according to an example embodiment.

DETAILED DESCRIPTION

Figure 1A:
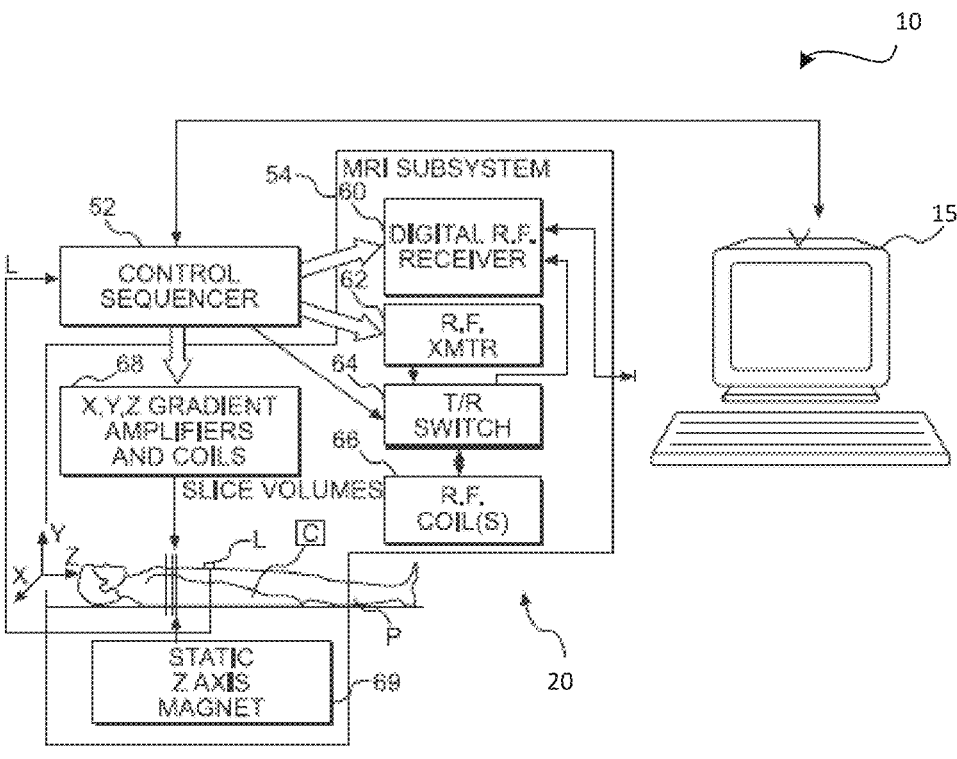
FIG. 1A is an illustration of a system for implementing methods according to example embodiments.

Various example embodiments will now be described more fully with reference to the accompanying drawings in which only some example embodiments are shown. Specific structural and functional details disclosed herein are merely representative for purposes of describing example embodiments. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated. The present invention, however, may be embodied in many alternate forms and should not be construed as limited to only the example embodiments set forth herein.

Detailed illustrative embodiments are disclosed herein. However, specific structural and functional details disclosed herein are merely representative for purposes of describing example embodiments. The example embodiments may, however, be embodied in many alternate forms and should not be construed as limited to only the embodiments set forth herein.

Independent of the grammatical term usage, individuals with male, female or other gender identities are included within the term.

Echo planar imaging (EPI) is a widely used pulse sequence for neuroimaging applications. EPI may include single-shot EPI and multi-shot EPI. EPI utilizes relatively high-speed image acquisition which allows an entire brain to be imaged in under two seconds. This relatively high acceleration allows clinicians to measure metabolic, microstructural, functional, and/or physiologic parameters in clinically realizable scan times. For example, diffusion tensor imaging (DTI), diffusion-weighted imaging (DWI), functional MRI (fMRI), and dynamic susceptibility contrast (DSC) imaging all utilize EPI and are commonly acquired for white matter fiber tract mapping, connectivity, or motor/language function mapping, and measurement of blood flow or volume, respectively, prior to surgery (e.g. BrainLab presurgical planning). Unfortunately, this relatively high acceleration can come at a significant cost, as EPI may be prone to imaging artifacts from off-resonance effects (e.g. fat-water shift, geometric distortions from B0 inhomogeneities from the patient, and signal loss due to dephasing), motion artifacts, and Nyquist ghosting from poor shimming, gradient coil heating, receiver filter asymmetry, susceptibility, reconstruction errors, or induction of eddy currents coils and/or magnet housing in response to the rapidly changing gradients.

One or more example embodiments described herein relate to methods, apparatuses, systems, and/or non-transitory computer-readable mediums configured to correct EPI imaging artifacts, generate a dataset of artifacted echo planar images and/or train a neural network to correct echo planar imaging artifacts. In some example embodiments, a synthetic EPI dataset may be created from high-resolution T2-weighted turbo-spin echo (TSE) and T1-weighted MPRAGE images, balanced steady-state free precession (balanced SSFP) images, and/or images acquired with radial or spiral k-space trajectories using a physics-based approach that realistically simulates commonly found artifacts in EPI images. This artifacted EPI dataset (also sometimes referred to herein as a synthetic EPI dataset) may then be used to train an artifact reduction algorithm driven by, for example, deep convolutional neural networks (CNN) to correct for one or more of these artifacts concurrently or simultaneously. Thus, one or more example embodiments described herein may enable faster and/or more efficient correction in diffusion, functional, and/or perfusion MRI neuroimaging applications, improving the diagnostic quality of these relatively highly accelerated imaging modalities.

Figure 1B:
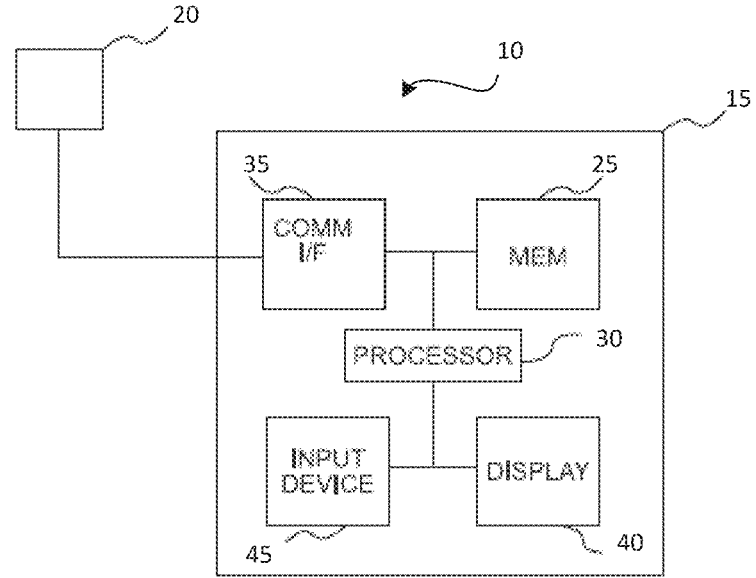
FIG. 1B is a block diagram illustrating an example embodiment of the system shown in FIG. 1A.

FIG. 1A is an illustration of a system for implementing methods according to example embodiments described herein. FIG. 1B is a block diagram illustrating an example embodiment of the system shown in FIG. 1A. Although one or more example embodiments may be described herein with regard to the systems shown in FIGS. 1A and 1B, example embodiments should not be limited to these examples.

Referring to FIGS. 1A and 1B, a system 10 may include an information processing device 15 and an acquisition device 20. The acquisition device 20 includes an MRI real-time control sequencer 52 and an MRI subsystem 54. The MRI subsystem 54 may include XYZ magnetic gradient coils and associated amplifiers 68, a static Z-axis magnet 69, a digital RF transmitter 62, a digital RF receiver 60, a transmit/receive switch 64, and RF coil(s) 66. The acquisition device 20 may include additional or fewer components in some example embodiments, and may be configured to image a patient.

The MRI subsystem 54 may be controlled in real-time by the MRI real-time control sequencer 52 to generate and measure magnetic field and radio frequency emissions that stimulate nuclear magnetic resonance ("NMR") phenomena in an object P (e.g., a human or other living body) to be imaged.

The information processing device 15 may implement a method for processing medical data, such as medical image data. As discussed in more detail below, one or more information processing devices such as the information processing device 15 may be configured to implement any or all of the example embodiments described herein.

In FIGS. 1A and 1B, the acquisition device 20 is shown as a separate unit from the information processing device 15. It is, however, possible to integrate the information processing device 15 as part of the acquisition device 20.

The information processing device 15 may include a memory 25, processing circuitry including at least one processor such as processor 30, a communication interface 35 and/or an input device 40. The memory 25 may include various special purpose program code including computer executable instructions which may cause the processor 30 of the information processing device 15 to perform one or more of the methods according to example embodiments described herein. The acquisition device 20 may provide the medical data to the information processing device 15 via the input device 40. In some example embodiments, the information processing device 15 may additionally include a display 45 that may be configured to output information about one or more of an imaging process, the information processing device 15, or the acquisition device 20.

Figure 2:
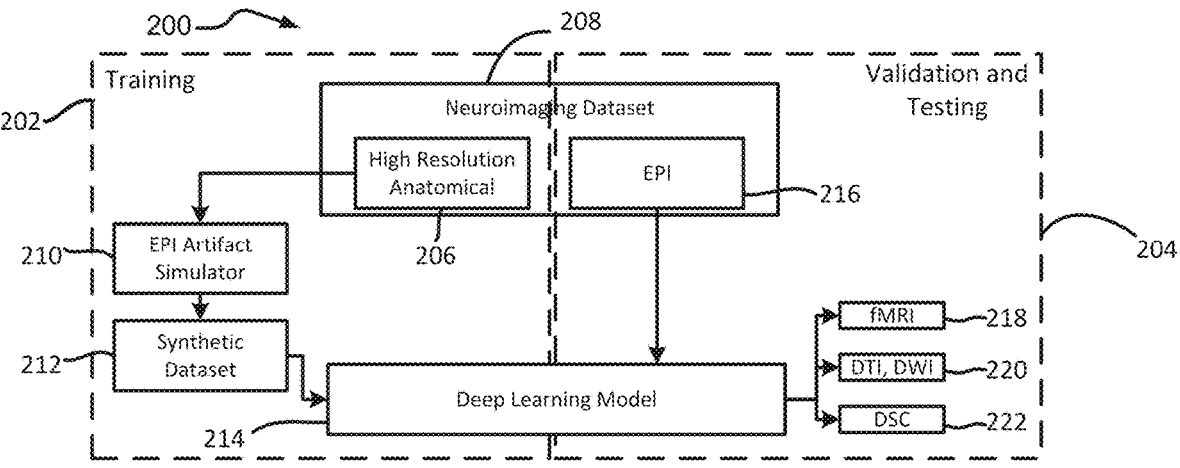
FIG. 2 is a block diagram illustrating a method of using deep learning-based artifact reduction according to an example embodiment.

FIG. 2 is a block diagram illustrating a method 200 of EPI artifact reduction according to an example embodiment. The method 200 may include a training phase 202 and a validation and testing phase 204.

Referring to FIG. 2, in the training phase 202, high-resolution anatomical images 206 may be acquired via a medical imaging modality (e.g., MRI, CT, etc.). In some embodiments, the high-resolution anatomical images 206 may be part of a neuroimaging dataset 208. The high-resolution anatomical images 206 may be modified by an EPI artifact simulator 210 (e.g., executed on a processing device, such as information processing device 15 in FIGS. 1A and 1B). The EPI artifact simulator 210 may modify the high-resolution anatomical images 206 to add simulated, synthetic, or artificial EPI artifacts to the high-resolution anatomical images 206. These modifications may result in images that include simulated, synthetic, or artificial EPI artifacts. The images may be referred to as artifacted images and the set of artifacted images may be an artifacted dataset 212. The artifacted dataset 212 may then be input into a deep learning model 214 (e.g., executed on a processing device, such as information processing device 15 in FIGS. 1A and 1B, in the cloud, etc.).

In one or more example embodiments, the artifacted dataset 212 may alternatively be obtained by modifying imaging equipment, such as the medical imaging modality shown in FIG. 1A. For example, imaging equipment may be altered to artificially introduce artifacts into images obtained by the imaging equipment. In one or more example embodiments, the imaging equipment may be modified by altering parameters used to obtain an image by the imaging equipment which may artificially introduce artifacts into obtained images. This altering may result in images created with at least one deliberately induced EPI artifact.

In the validation and testing phase 204, the method 200 may include obtaining EPI images 216 (e.g., via a medical imaging modality, such as that shown in FIG. 1A). In some example embodiments, the EPI images 216 may be part of the neuroimaging dataset 208. The EPI images 216 may be input into the deep learning model 214 for testing. In some example embodiments, the deep learning model 214 may receive the EPI images 216 and may correct the EPI images to remove EPI artifacts from the EPI images 216. The deep learning model 214 may be configured to correct all or substantially all of the EPI artifacts of the EPI images 216 at once (e.g., concurrently or simultaneously).

After testing the deep learning model 214 on the EPI images 216, the deep learning model 214 may be applied to more advanced EPI images such as fMRI images 218, DTI and/or DWI images 220, and DSC images 222. In some example embodiments, the deep learning model 214 may also receive the EPI images 216 for anatomical evaluation and/or diagnosis. Various aspects of the example embodiment shown in FIG. 2 will be discussed in more detail below with regard to FIGS. 3-21.

Figure 3:
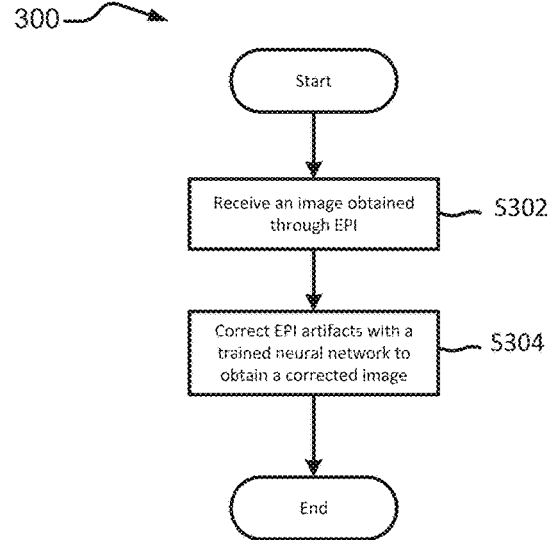
FIG. 3 is a flow chart of a method of correcting echo planar imaging (EPI) artifacts according to an example embodiment.

FIG. 3 is a flow chart of a method 300 of correcting EPI artifacts according to an example embodiment. For example purposes, the example embodiment shown in FIG. 3 will be discussed with regard to the system shown in FIGS. 1A and 1B. However, example embodiments should not be limited to this example.

Referring to FIG. 3, at step S302, the processor 30 receives at least one image obtained through EPI. As described above, the at least one image may be obtained by one of high angular resolution DTI, DWI, fMRI, or DSC imaging. Other imaging methods not included herein may also perform EPI. Once a EPI image is obtained by the processor 30 at step S302, the processor 30 may correct artifacts of the EPI image with a trained neural network at step S304. A corrected image may be obtained once the processor 30 corrects the EPI image. The corrected image may be the obtained EPI image with the EPI imaging artifacts eliminated or reduced.

In one or more example embodiments, EPI artifacts may include physics-based artifacts, reconstruction artifacts, and/or acquisition artifacts. More specifically, for example, physics-based artifacts may include B0 susceptibility artifacts and/or chemical shift artifacts. B0 susceptibility artifacts may include signal dropout and/or geometric distortion. Reconstruction artifacts may include Rician noise artifacts. Acquisition artifacts may include Nyquist/echo shift artifacts, Gibbs ringing/downsample artifacts, and/or under-sampling and/or limited k-space coverage artifacts. Additional artifacts that the trained neural network may correct may include coil profile artifacts, parallel imaging artifacts, ramp sampling artifacts, eddy-current induced geometric distortion artifacts, complex (Gaussian) noise artifacts, B1-sensitivity profile effects artifacts, metal implant artifacts, and/or "blinds" artifacts/missing slices. Although example embodiments are discussed herein with regard to this list of EPI artifacts, this list is non-limiting and additional EPI artifacts may also be corrected by one or more example embodiments of the method 300.

Figure 4:
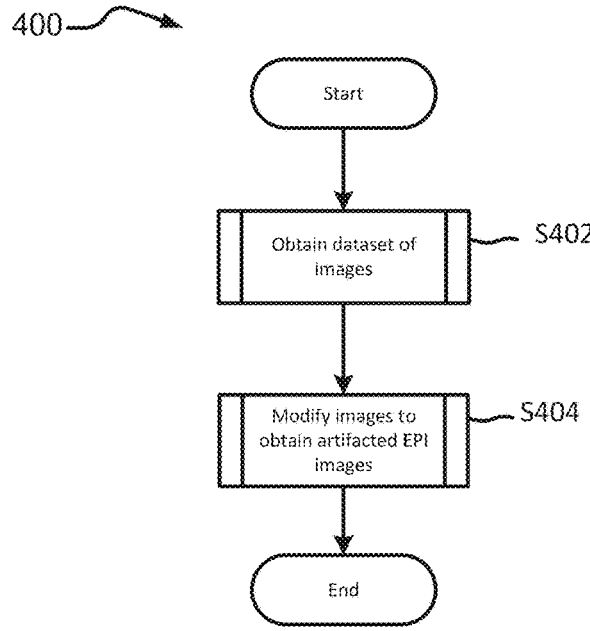
FIG. 4 is a flow chart of a method of generating a dataset of synthetic echo planar images according to an example embodiment.

FIG. 4 is a flow chart of a method 400 of generating a dataset of artifacted EPI images according to an example embodiment. For example purposes, the example embodiment shown in FIG. 4 will be discussed with regard to the system shown in FIGS. 1A and 1B. However, example embodiments should not be limited to this example. For example, different steps of the method 400 may be performed or executed by different processors or computer systems. In particular, a trained model may be executed or deployed via a first processor such as a processor of a scanner system and training of the trained model may be executed or deployed via a second processor such as a processor of a computer or computer system or cluster separate from the scanner system. Thus, the dataset of artifacted EPI images may be separate from any machine or equipment that a potential patient, customer, or user would have access to.

Referring to FIG. 4, at step S402, the processor 30 obtains a dataset of images. After the dataset of images is obtained, the processor 30 may modify images from the dataset of images to obtain artifacted echo planar images at step S404.

In one or more example embodiments, the dataset of artifacted images may be high-resolution anatomical images that may have been generated by imagining processes other than through EPI. The high-resolution images defining the dataset of images may be modified by altering the images to include simulated EPI artifacts. In one or more example embodiments, the simulated EPI artifacts may include at least one of B0 susceptibility artifacts, chemical shift artifacts, Rician noise artifacts, Nyquist artifacts, and/or Gibbs ringing artifacts. Example embodiments of steps S402 and S404 will be discussed in more detail below.

Figure 5:
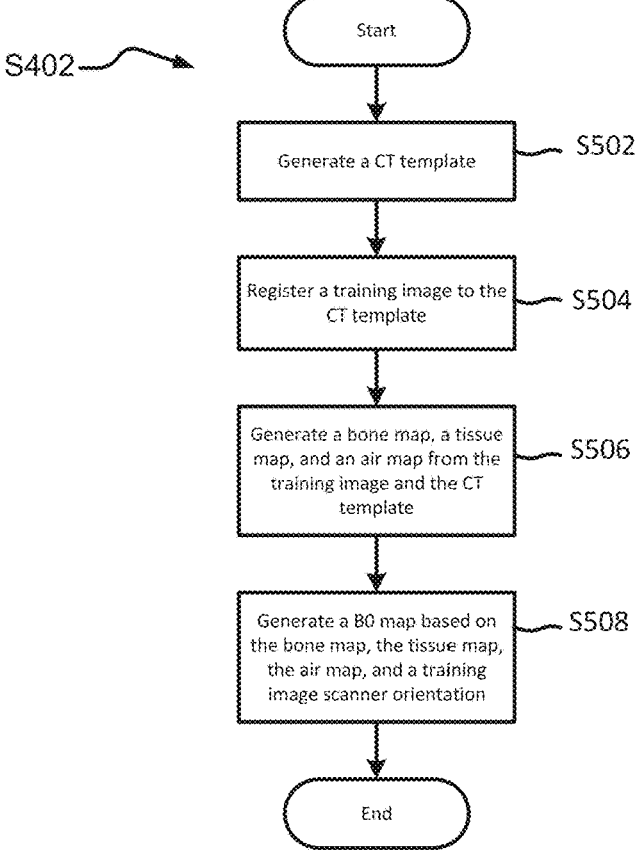
FIG. 5 is a flow chart of an example embodiment of a method of obtaining a dataset of images at S402 in FIG. 4.

FIG. 5 is a flow chart of an example embodiment of a method S402A for obtaining a dataset of images at S402 in FIG. 4. The method of FIG. 5 is shown with a plurality of steps directed to obtaining a dataset of images to be modified to include B0 susceptibility artifacts for example purposes.

FIG. 6 is a flow chart of an example embodiment of a method S404A for modifying an obtained dataset of images at S404 in FIG. 4. The modifying in FIG. 6 is described with regard to the dataset of images obtained according to the method S402A shown in FIG. 5.

For example purposes, the example embodiments shown in FIGS. 5 and 6 will be discussed with regard to the system shown in FIGS. 1A and 1B. However, example embodiments should not be limited to this example. For example, different steps of the method S402A and the method S404A may be performed or executed by different processors or computer systems. In particular, a trained model may be executed or deployed via a first processor such as a processor of a scanner system and training of the trained model may be executed or deployed via a second processor such as a processor of a computer or computer system or cluster separate from the scanner system. Thus, the dataset of artifacted EPI images may be separate from any machine or equipment that a potential patient, customer, or user would have access to.

Referring to FIG. 5, at step S502, the processor 30 generates a CT template. In some embodiments, the CT template may be a known template that may be found online such as in an imaging archive or database. The CT template may include coverage of the head, neck, and/or shoulders of a human body. In one or more example embodiments, it may be beneficial to include the head, neck, and shoulders to capture magnetic field inhomogeneities from tissue interfaces near each of the nasal cavity, mouth, sphenoid sinus, temporal bones, and/or air/tissue interfaces at the shoulders.

After the CT template is generated, the processor 30 registers a training image to the CT template at step S504. The training image may be a high resolution anatomical image. As described above with reference to FIG. 4, high resolution anatomical images may be generated by imaging processes other than through EPI. The training image may be registered to the CT template in any known manner. When the training image is registered to the CT template, the training image is modified such that a resulting image is of a different image type than the original training image.

At step S506, the processor 30 may generate a bone map, tissue map, and air map from the registered training image and the CT template. In one or more example embodiments, the CT template may be registered to the Montreal Neurological Institute (MNI) space, where the MNI space is a standard proportional stereotaxic space. Threshold-based segmentation may be performed on the CT template to generate the bone map, the tissue map, and the air map.

At step S508, the processor 30 may generate a B0 field inhomogeneity map (B0 map) based on the bone map, the tissue map, the air map, and a training image scanner orientation. The B0 map may be referred to as a field map in some example embodiments. In some example embodiments, the B0 map may be calculated using Fourier-based calculation methods. Using the orientation of the training image scanner to generate the B0 map may mimic a realistic head positioning and may introduce additional variability. Additional details of step S508 may be found in Alias subtraction is more efficient than conventional zero-padding in the Fourier-based calculation of the susceptibility-i perturbation of the magnetic field in MR. Magnetic resonance in medicine, Bouwman J G, Bakker C J, 2012 August; 68 (2): 621-30, the entire contents of which are incorporated herein by reference.

Referring now to FIG. 6, the modifying the obtained dataset of images in S404A may include applying a B0 artifact to the training image using a physics model based on sequence acquisition parameters. Additional details of step S508 may be found in Fast Fourier-based simulation of off-resonance artifacts in steady-state gradient echo MRI applied to metal object localization, Zijlstra F, Bouwman J G, Braškutė I, Viergever M A, Seevinck P R, Magnetic resonance in medicine, 2017 November; 78 (5): 2035-41, the entire contents of which are incorporated herein by reference.

In more detail, at step S602, the processor 30 may generate a displacement field based on the B0 map and based on sequence acquisition parameters. The displacement field may be proportional to the B0 map and may be computed from or may be used to compute the B0 map given knowledge of the acquisition parameters. In at least one example embodiment, the displacement field may be generated by subtracting a mean value of field inhomogeneity ($\Delta$B0) within the brain from the B0 map.

At step S604, the processor 30 may apply the displacement field to the training image to generate the artifacted EPI image. Additional details of step S604 may be found in Alias subtraction is more efficient than conventional zero-padding in the Fourier-based calculation of the susceptibility-i perturbation of the magnetic field in MR. Magnetic resonance in medicine, Bouwman J G, Bakker C J, 2012 August; 68 (2): 621-30, the entire contents of which are incorporated herein by reference. The artifacted EPI image may be of a different image type than the original training image and the training image registered to the CT template.

FIG. 7 shows example images of both a B0 map and a susceptibility map as described above with reference to FIGS. 5 and 6. Images A, B, and C show the B0 map and images D, E, and F show the susceptibility map.

FIG. 8 is a flow chart of an example embodiment of a method S402B for obtaining a dataset of images at S402 in FIG. 4. The method of FIG. 8 is shown with a plurality of steps directed to obtaining a dataset of images to be modified to include a chemical shift artifact. In one or more example embodiments, chemical shift artifacts may be simulated as a shift of pixels containing fat-containing non-brain tissue.

FIG. 9 is a flow chart of an example embodiment of a method S404B for modifying an obtained dataset of images at S404 in FIG. 4. The modifying in FIG. 9 is described with regard to the dataset of images obtained according to the method S402B shown in FIG. 8.

For example purposes, the example embodiments shown in FIGS. 8 and 9 will be discussed with regard to the system shown in FIGS. 1A and 1B. However, example embodiments should not be limited to this example.

Referring to FIG. 8, at step S802, the magnetic resonance (MR) images are obtained, for example, via the system shown in FIG. 1A.

After the MR images are obtained, at step S804 the processor 30 generates at least two single component images from each of the MR images. To generate the single-component images, the brain may be segmented. In at least one example embodiment a tool such as the Brain Extraction Tool, FSL, FMRIB Software Library v6.0, Oxford, UK, may be used to segment the brain. Then, a fat-containing tissue mask for each patient may be determined by subtracting the brain mask and applying a threshold to remove the background pixels. In at least one example embodiment, from an MR image, one single-component image may include water and brain matter and another single-component image may include lipids and bone matter of the MR image. These single component images may be included in the dataset of images obtained at step S402 of FIG. 4.

Referring to FIG. 9, at step S902, the processor 30 may scale the tissue signal intensity of each single component image. For example, the signal intensity may be modulated by multiplying the single-component image by a scale factor. In a normal distribution the scale factor may be between 0 and 1. In one or more example embodiments, the tissue signal intensity may be scaled based on simulation settings.

After the processor 30 scales the tissue signal intensity of each single component image, the processor 30 may compute a signal shift at step S904. In one or more example embodiments, the signal shift may be computed based on sequence acquisition parameters and Larmor frequency of tissue relative to brain tissue. In one example, computing a signal shift for each component may include shifting a phase of the particular component. The signal shift or pixel shift may be determined using a fat-water frequency difference at 3T (430 Hz) and a pixel bandwidth along a phase-encoding direction. The pixel bandwidth may be determined by a random variable of echo-spacing between 0.6 to 1.3 milliseconds (ms). In at least one example embodiment, it may be assumed that there are a total of 128 pixels and a GRAPPA factor of 3 along the phase-encoding direction.

After the signal shift is computed, the processor 30 may generate translated images using the computed signal shift at step S906. In one or more embodiments, the translated images are generated by performing a fractional pixel shift using linear interpolation.

After the translated images are generated, the processor 30 may combine the translated images at step S908. The translated images may be combined as a sum of the images because the components of the images have previously been separated. In other example embodiments, the translated images may be combined by using a phase shift that may be constant or with a spatial dependence, a complex addition operation, or a magnitude operation. The translated images are combined to generate a artifacted EPI image to be included in a dataset of artifacted echo planar images.

In one or more example embodiments, chemical shift artifacts may be simulated by other methods. For example, if reference images are acquired with a Dixon method, then the corresponding fat-only and water-only data may be used to simulate chemical shift artifacts without the need to use a segmentation algorithm. Additionally, different evolutions of a signal phase from fat and water spins may be considered when combining original and shifted data. For example, the shifted data may be multiplied by a complex phase factor to add a phase. The complex phase factor may be $p(r)=\exp(i \, phi(r))$, where $phi(r)=omega(r)*TE'=2 \, pi \, (df+f(r)) \, TE'$. In this example, TE' is the effective evolution time (considering time reversal after refocusing RF-pulses), df is the fat-water frequency difference and f(r) is an (optional) additional frequency deviation, which accounts for possible variations in the B0-field at the positions of the fat spins and of the water spins with signals contributing to a certain location in the image.

Other known methods of simulating EPI artifacts may be performed to obtain a dataset of artifacted images to be used to train a neural network to correct EPI artifacts. For example, Nyquist artifacts may be simulated as a linear phase difference between data sampled in even and odd k-space lines. In this example, T2-weighted images may be transformed into a frequency domain and may have a phase artifact added along a readout direction to the even k-space lines in a phase-encoding direction. A linear phase ramp may be simulated using a constant term b and a first-order term a: $\phi(k_x)=(ak_x+b)\pi$, wherein both a and b may be randomly drawn from normal distributions centered at zero with standard deviations of 0.2 and 0.04, respectively. In some example embodiments, directions of the frequency and phase encodings may also be randomized to increase variability. In some example embodiments, there may be about an 80% chance of the phase-encoding direction being anterior-posterior and about a 20% chance of the phase-encoding direction being left-right. Once the linear phase artifacts are added to the even k-space lines, the data may be transformed back to the image domain to create images with simulated EPI artifact.

In some example embodiments, Nyquist ghosting artifacts may be simulated from non-linear phase differences. For example, phase errors may be distributed to both even and odd lines rather than applying a phase difference to only one of the even lines or the odd lines. Nyquist ghosting artifacts may also be simulated in an image domain by adding an attenuated replica of the images, shifted by FOV/N where N=2 for fully sampled acquisitions and N=2*f if an undersampling factor f gets applied.

In some example embodiments, simulated images with Rician noise artifacts may be created. Images with Rician noise artifacts may be images with low SNR. In some example embodiments, a noise parameter may be a random variable between 0 and 0.1, which may represent a standard deviation of Gaussian noise in a real and imaginary image. This noise parameter may be applied to an image to create an image with a simulated EPI artifact. In other embodiments, Rician noise artifacts may be introduced by transforming image data to a Fourier domain, adding complex Gaussian noise, transforming the image data back to the image domain, and extracting magnitude images.

FIG. 10 is a flow chart illustrating a method 1000 of training a neural network to correct EPI artifacts. For example purposes, the example embodiments shown in FIG. 10 will be discussed with regard to the system shown in FIGS. 1A and 1B. However, example embodiments should not be limited to this example. For example, different steps of the method 1000 may be performed or executed by different processors or computer systems.

Referring to FIG. 10, at step 1002, the processor 30 may input a dataset of artifacted EPI images into a neural network. In one or more example embodiments, the dataset of artifacted EPI images may include images with at least one synthetic EPI artifact. In some example embodiments, the images of the dataset of artifacted EPI images may include images with at least one simulated EPI artifact. Additionally or alternatively, the images of the dataset of artifacted EPI images may include images obtained by modifying each image of a dataset of images to include at least one simulated EPI artifact. In some example embodiments, the images of the dataset of images may be modified according to one or more of the methods described herein. In some example embodiments, the simulated EPI artifacts may include one or more of B0 susceptibility artifacts, chemical shift artifacts, Rician noise artifacts, Nyquist artifacts, Gibbs ringing artifacts, or another EPI artifact.

At step 1004, the neural network may modify each image of the dataset of artifacted EPI images to remove the at least one EPI artifact. In at least one example embodiment, the neural network may be trained by comparing a modified image with the simulated EPI artifacts removed to an image that was obtained prior to having the simulated EPI artifacts added. The initial image may be free from artifacts and may be used to train the neural network to accurately remove EPI artifacts.

At step 1006, one or more parameters of the neural network may be updated in order to train the neural network. In at least one example embodiment, the modified image that is output by the neural network may be compared to a ground truth image that was used to generate the artifacted images. The modified image may also be analyzed by another trained network such as a discriminator network to determine a quality of the modified image. In at least one example embodiment, the quality of the modified image may be analyzed by the discriminator network by determining a similarity between the modified image and unartifacted images. Following this quality determination, the one or more parameters of the neural network may be updated in an attempt to generate higher quality output images in a sequential round of comparisons. This process may be repeated until a desired quality is achieved, for a given, desired, or alternatively predetermined, number of rounds, or until the quality stops improving.

In at least one example embodiment, training of the neural network via the method 1000 may be completed (e.g., only) on small, randomly chosen subsets of images from the dataset of artifacted images. The small, randomly chosen subsets of images may be referred to as batches. For example, the steps described above with reference to the method 1000 may not be performed with the entire dataset of artifacted images but may be performed on batches of the dataset of artifacted images. The parameters of the neural network may be updated after evaluation (e.g., computation of a loss/quality) on the individual batches of the dataset of artifacted images. In at least one example embodiment, the number and size of the selected subset of the dataset of artifacted images may vary per round.

In at least one example training of a neural network, 3,804 3D MRI scans from 1,372 patients were obtained. The entire dataset was converted to Neuroimaging Informatics Technology Initiative (NIFTI) format and registered to a standard template in MNI space. The dataset included 1,901

T2-weighted turbo-spin echo (TSE) scans and 1,903 MPRAGE images, which were used to create synthetic EPI images. The dataset was then divided into a training set that included 3,204 scans and a validation set and test set that included 300 images each. The neural network was trained with the training set. After training, the neural network was validated with the validation set and tested with the test set. In this example, the training process was performed with a GPU cluster comprised of 44 NVIDIA™ GPUS: 20 Quadro RTX 8000, 8 Tesla V100, and 16 GeForce RTX 2080 Ti.

In one or more example embodiments, training the neural network to correct EPI artifacts may additionally include validating the neural network with a validation dataset of artifacted EPI images. Each image of the validation dataset of artifacted EPI images may include at least one synthetic EPI artifact.

As described above, in one or more example embodiments, the neural network may be trained using a combination of supervised and unsupervised learning. Supervised learning is generally known in the art and may include training of the neural network that involves computing loss of the neural network by comparing an output of the neural network, such as the modified images, to a ground-truth image, such as the unartifacted image used to generate the artifacted images input into the neural network. Thus, for each input into the neural network, there is a corresponding desired output. Unsupervised learning is similarly generally known in the art and may involve computing loss of the neural network without requiring a corresponding desired output.

The neural network may also be trained using an iterative fine-tuning approach. An iterative fine-tuning approach may allow the neural network to be trained on a first EPI artifact prior to introducing a second EPI artifact. This process may allow the neural network to fine tune correction of each of the EPI artifacts that it is trained to correct. The second training step, where the neural network is trained on both the first EPI artifact and the second EPI artifact may by a fine-tuning step of the iterative fine-tuning approach.

For example, a first model may be trained with images including only B0 susceptibility artifacts. Once the first model has converged and the test results surpass a threshold success rate, the first model may be deemed to be trained successfully. After the first model is trained successfully, a second EPI artifact may be introduced for training of a second model. For example, the second model may be trained with images that include both B0 susceptibility and chemical shift artifacts. The second model may be initialized with the weights of the first model so that the training and learning of the first model is transferred to the second model which allows the second model to benefit from previous learning when applied to a more complex dataset. This process may be repeated for each new EPI artifact such that a final model is trained on a dataset that includes each of the above-mentioned EPI artifacts.

In one or more example embodiments, the neural network may be at least one of a general adversarial network (GAN), a multiscale generator model architecture, a GAN multiscale generator model with attention architecture, or a GAN generator model with attention and with recurrent convolutional layers architecture. In at least one example embodiment, the neural network may be a Pix2Pix GAN basic UNet generator model architecture, a Pix2Pix GAN attention UNet generator model architecture, or a Pix2Pix GAN attention R2UNet generator model architecture. In at least one example embodiment, the loss metric that a neural network described herein is trained to reduce and/or minimize may include at least one of a discriminant loss, Wasserstein loss, or a loss computed using a pretrained (neural network) model (e.g., perceptual loss).

Figure 11:
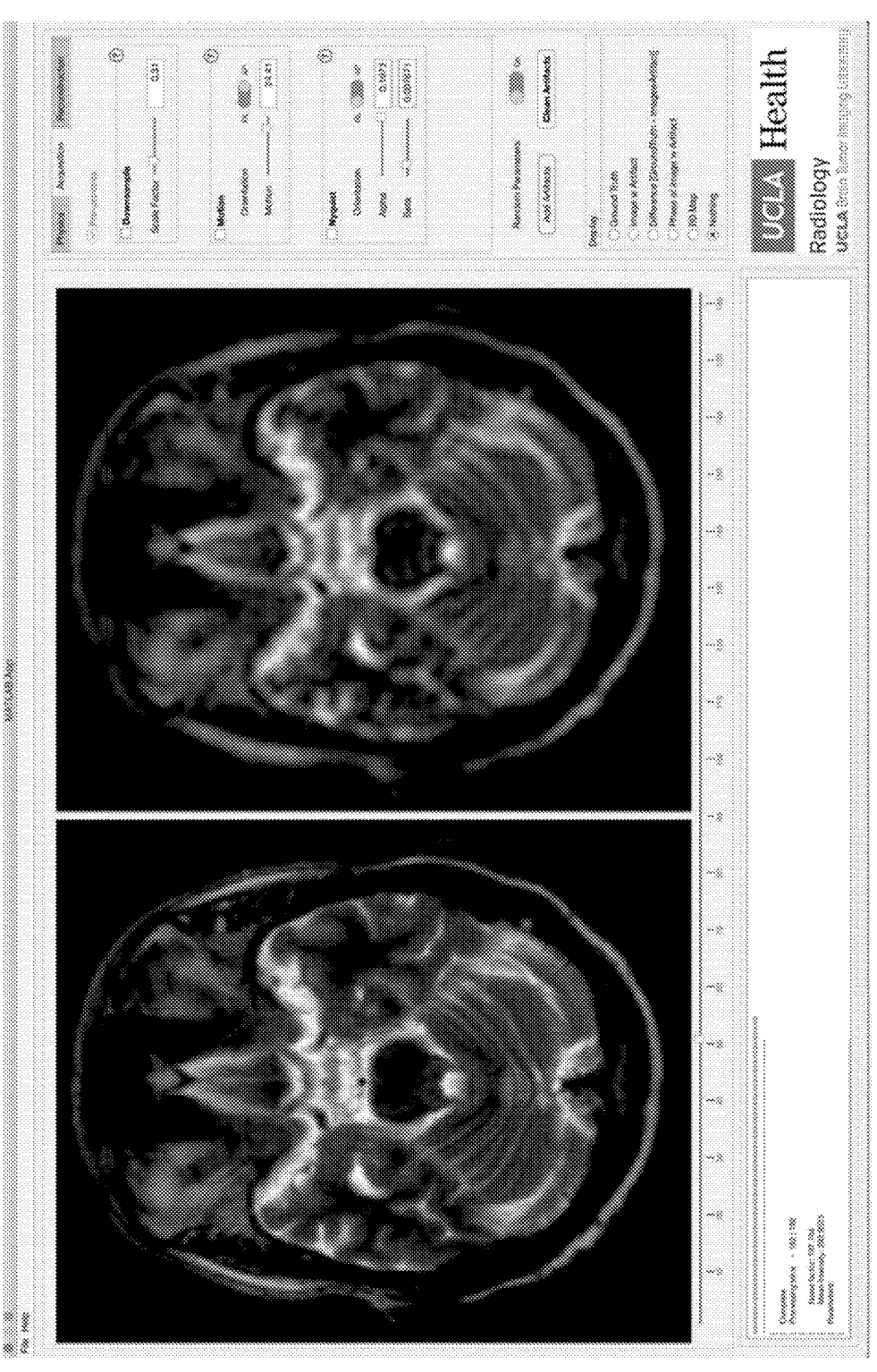
FIG. 11 is an example user interface of a program used to create simulated EPI images according to an example embodiment.

FIG. 11 is an example graphical user interface (GUI) 1100 of an application for simulating EPI artifacts. The application may include an interface for each of the artifacts described above and may be adapted to include additional artifacts. A user may interact with the application to specify at least an intensity and an orientation of an artifact to be added to an image. The application may allow a user to have control over the presence and severity of different artifacts to aid in testing and failure analysis of a neural network used to correct EPI artifacts from images. In one or more example embodiments, each artifact of the application may include a help button. When a user presses the help button, the methodology used to create the particular artifact and any relevant references may be displayed. The application may be used to generate synthetic EPI images that may be used to train a neural network to correct artifacts of EPI images. In at least one example embodiment, the application may additionally include scripting capabilities such as a programmatic interface. The programmatic interface may allow a relatively large number of EPI images to be generated without user interaction or input.

Figure 12A:
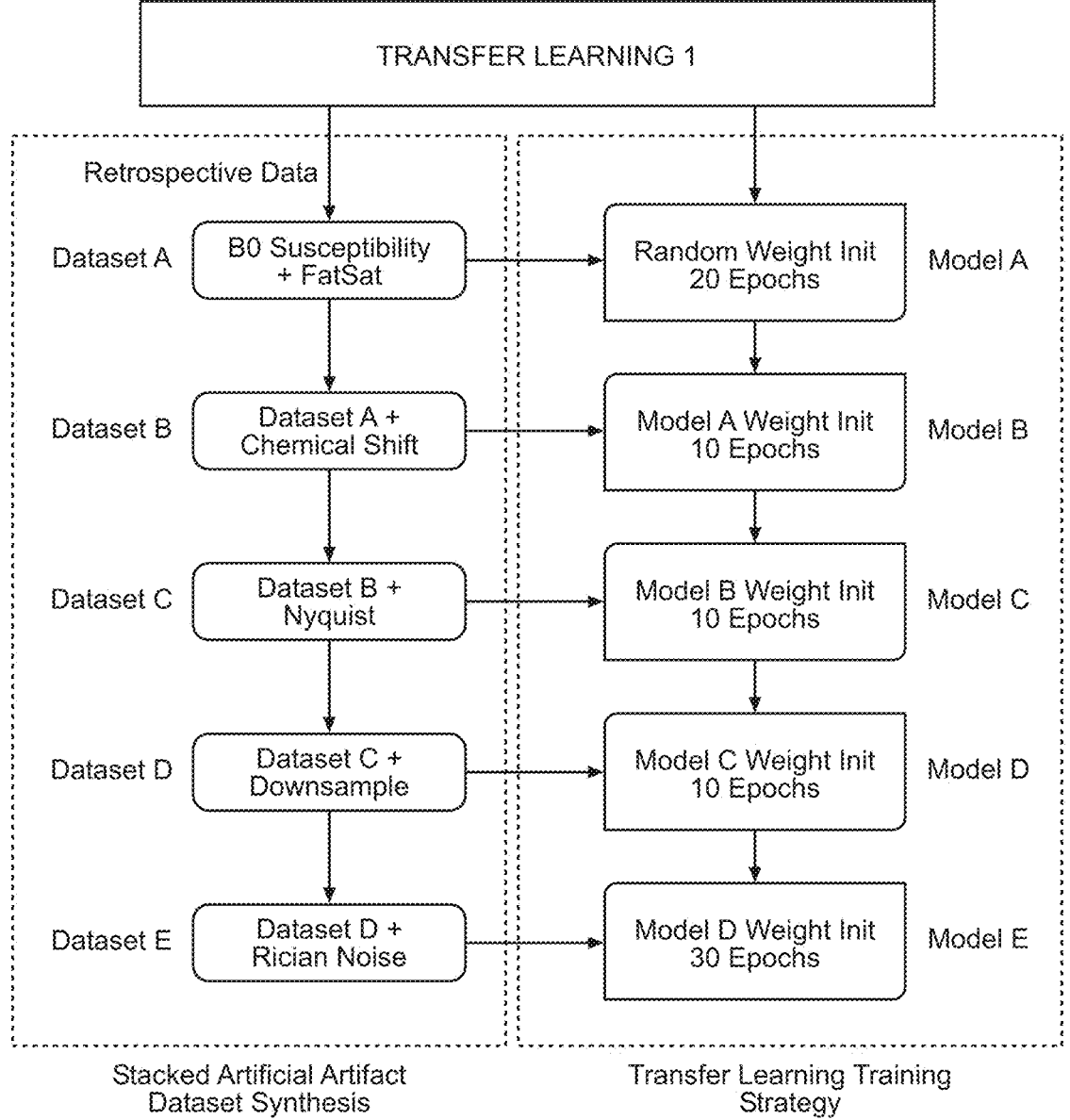
FIG. 12A is method of iteratively training a neural network according to an example embodiment.
Figure 12B:
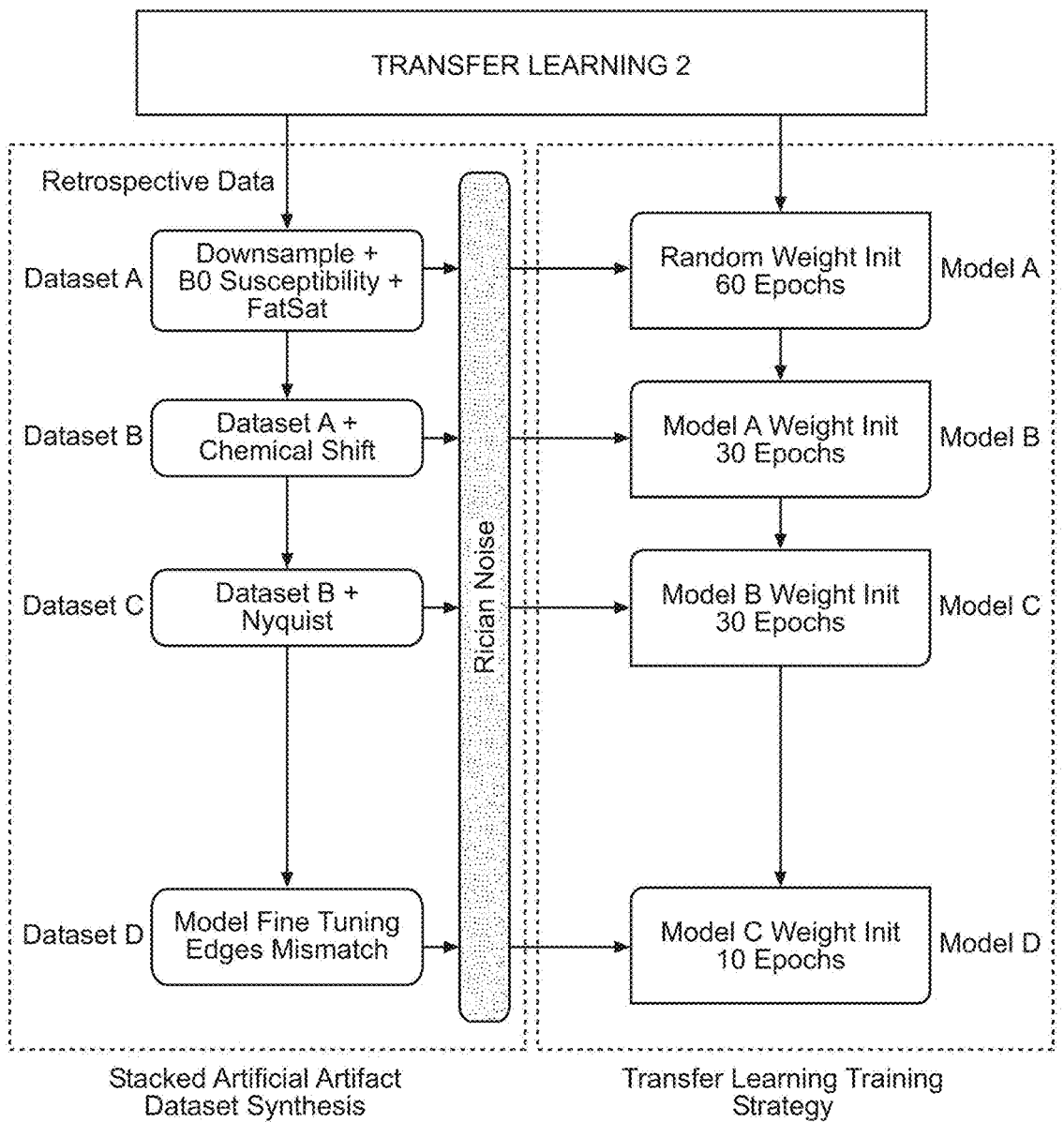
FIG. 12B is another method of iteratively training a neural network according to an example embodiment.

FIGS. 12A and 12B show example embodiments of training a neural network to correct EPI artifacts. In both FIGS. 12A and 12B, a method of stacked artificial artifact dataset synthesis is used as well as a transfer learning training strategy to train the neural network.

FIG. 12A shows an example embodiment of training a neural network to correct EPI artifacts. A retrospective dataset may be generated based on an input dataset that does not include EPI artifacts. For example, a first dataset, dataset A, may be a dataset of artifacted images that includes B0 susceptibility artifacts and fat saturation that are introduced into the retrospective dataset. The dataset A may be input into the neural network where a first iteration includes a random weight and performs 20 epochs. This iteration of training of the neural network may be model A.

After the neural network is trained on the dataset A, dataset B is generated. The dataset B may include the dataset of artifacted images of dataset A with an additional chemical shift artifact. The dataset B is then input into the neural network where a second iteration includes the weight of model A and performs 10 epochs. This iteration of training may result in model B. This process of adding one additional artifact type to the dataset of artifacted images is repeated for as many artifacts as there are to introduce into the images.

As shown in FIG. 12A, dataset C includes dataset B plus Nyquist artifacts. The dataset C is input into the neural network where a third iteration includes the weight of model B and performs 10 epochs. This iteration of training may result in model C. Dataset D includes dataset C plus downsample artifacts. The dataset D is input into the neural network where a fourth iteration includes the weight of model C and performs 10 epochs. This iteration of training may result in model D. Dataset E includes dataset D plus Rician noise artifacts. The dataset E is input into the neural network where a fifth iteration includes the weight of model D and performs 30 epochs. This iteration of training may result in model E. Additional artifacts may be introduced in additional datasets that may be introduced into the neural network as described above with reference to datasets A-E of FIG. 12A.

FIG. 12B show another example embodiment of training a neural network to correct EPI artifacts. A retrospective dataset may be generated based on an input dataset that does not include EPI artifacts. For example, a first dataset, dataset A, may be a dataset of artifacted images that includes B0 susceptibility artifacts, fat saturation, and down-sampling artifacts that are introduced into the retrospective dataset. The dataset A may then have Rician noise introduced prior to inputting the dataset A into the neural network. The dataset A may be input into the neural network where a first iteration includes a random weight and performs 60 epochs. This iteration of training of the neural network may be model A.

After the neural network is trained on the dataset A, dataset B is generated. The dataset B may include the dataset of artifacted images of dataset A with an additional chemical shift artifact. The dataset B may then have Rician noise introduced prior to inputting the dataset B into the neural network. Introducing Rician noise prior to inputting the dataset B into the neural network may be referred to as data augmentation because the dataset B is preprocessed prior to being input into the neural network. The dataset B is then input into the neural network where a second iteration includes the weight of model A and performs 30 epochs. This iteration of training may result in model B. This process of adding one additional artifact type to the dataset of artifacted images is repeated for as many artifacts as there are to introduce into the images.

As shown in FIG. 12B, dataset C includes dataset B plus Nyquist artifacts. The dataset C may then undergo data augmentation to have Rician noise introduced prior to inputting the dataset C into the neural network. The dataset C is input into the neural network where a third iteration includes the weight of model B and performs 30 epochs. This iteration of training may result in model C. Dataset D may be a model fine tuning dataset that may receive the dataset C as an input. The dataset D may be used for edges mismatch. The dataset D may then undergo data augmentation to have Rician noise introduced prior to inputting the dataset D into the neural network. The dataset D is input into the neural network where a fourth iteration includes the weight of model C and performs 10 epochs. Additional artifacts may be introduced in additional datasets that may be introduced into the neural network as described above with reference to datasets A-C of FIG. 12B.

In one or more example embodiments, the datasets of FIGS. 12A and 12B may each be generated prior to beginning the process of training the neural network. For example, datasets A, B, C, D, and E of FIG. 12A and datasets A, B, C, and D of FIG. 12B may each be generated prior to dataset A being input into the neural network. Thus, datasets B, C, D, and E of FIG. 12A and datasets B, C, and D of FIG. 12B may be input into the neural network after the neural network is trained on the previous dataset and without requiring the respective dataset to be generated during the training process.

In at least one example embodiment, a neural network as described above may employ at least one of a generative adversarial network (GAN) (e.g., Pix2Pix), a multiscale generator model architecture (e.g., UNet), a GAN multiscale generator model with attention architecture, a GAN generator model with attention and with recurrent convolutional layers architecture (e.g., R2UNet). In at least one example embodiment, the loss metric that the network is trained to minimize may include at least one of a discriminant loss, Wasserstein loss, or a loss computed using a pretrained (neural network) model (e.g., perceptual loss).

Figure 13:
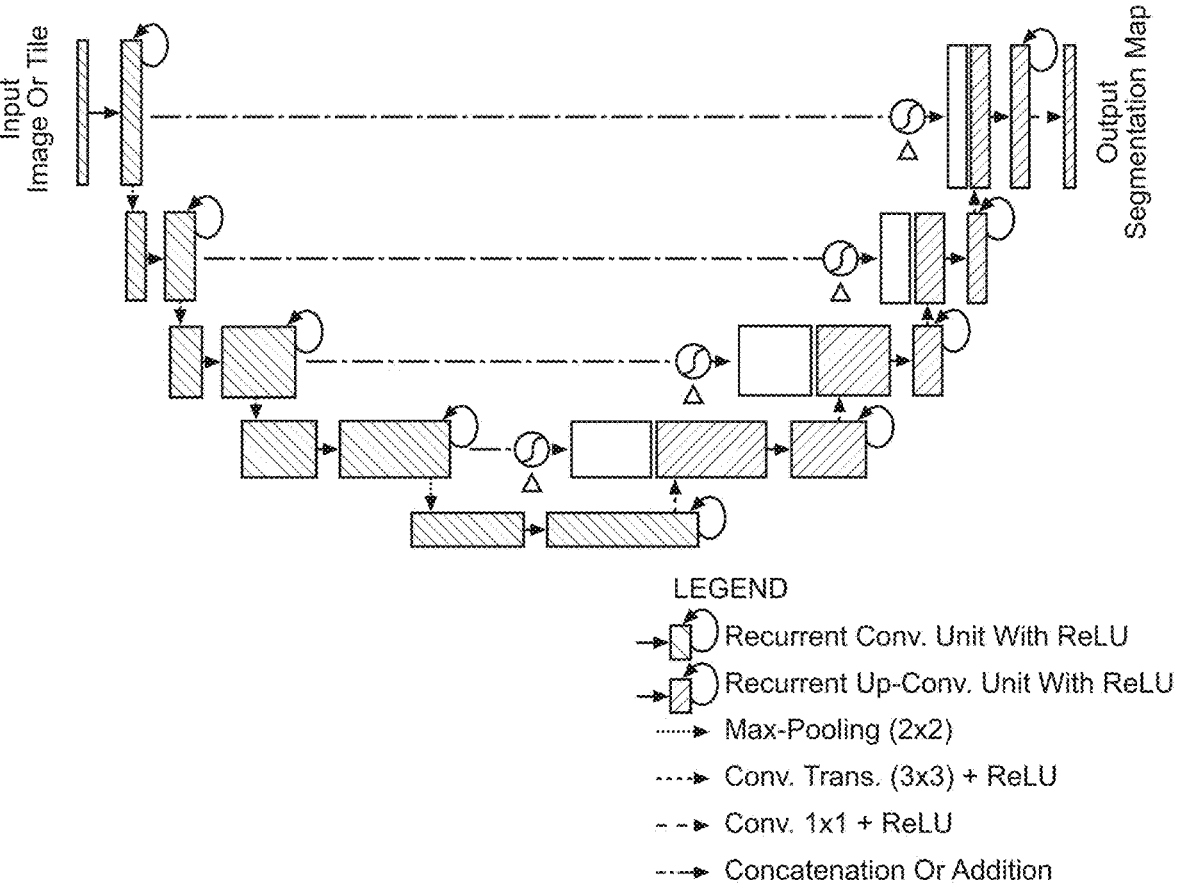
FIG. 13 is an illustration of a generator portion of an example embodiment of a generative adversarial network (GAN) configured to perform the method of FIG. 3.

FIG. 13 depicts an example network or model architectures that may be an example embodiment of a neural network as described herein to correct EPI artifacts.

Referring to FIG. 13, a Pix2Pix GAN attention R2UNet generator model architecture is shown. The Pix2Pix GAN attention R2UNet generator model architecture may utilize the power of UNet, Residual Network, as well as Recurrent Convolutional Neural Network (RCNN) with attention gates for the generator. In some example embodiments, the Pix2Pix GAN attention R2UNet generator model architecture may have several benefits. One benefit may be that the Pix2Pix GAN attention R2UNet generator model architecture includes a residual unit that may alleviate the problem of vanishing gradients seen in other deep learning models which may help with training deep architecture. An additional benefit may be feature accumulation with recurrent residual convolutional layers that may ensure better feature representation. Another benefit may be that the Pix2Pix GAN attention R2UNet generator model architecture may focus on the main areas of the images by using the attention gates. Each of these benefits helps to create a more stable U-Net architecture without changing the number of network parameters In one or more example embodiments, a neural network as described herein may be a Pix2Pix GAN basic UNet generator model architecture. The generator of this model architecture may include a whole image-to-image auto-encoder network with UNet skip connections to generate better image quality at higher resolutions. The Discriminator in the Pix2Pix GAN may include a PatchGAN Discriminator network that may output a classification matrix.

In one or more example embodiments, a neural network as described herein may alternatively be a Pix2Pix GAN attention UNet generator model architecture. This model architecture includes at least one attention gate. The one or more attention gates may be implemented at skip connections and may actively suppress activations in irrelevant regions. This may help to reduce the number of redundant features, which may reduce the computational resources wasted on irrelevant activations.

Figure 14:
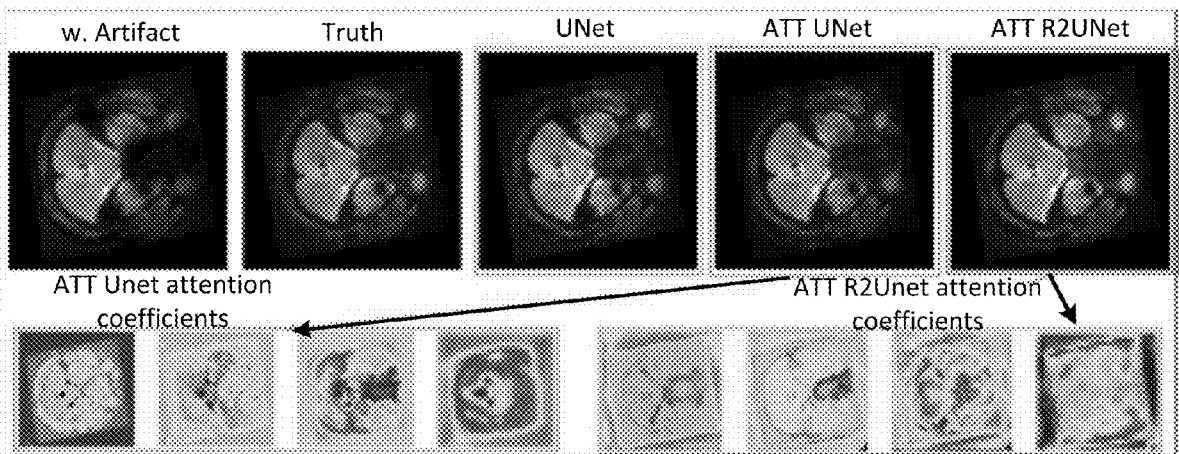
FIGS. 14-16 are a collection of example images illustrating the method of FIG. 3.
Figure 15:
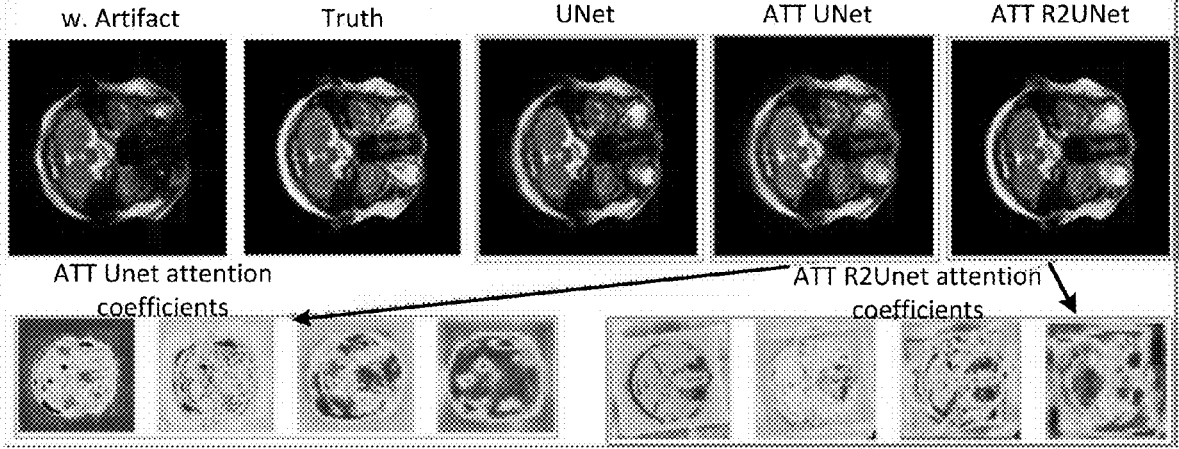
Figure 16:
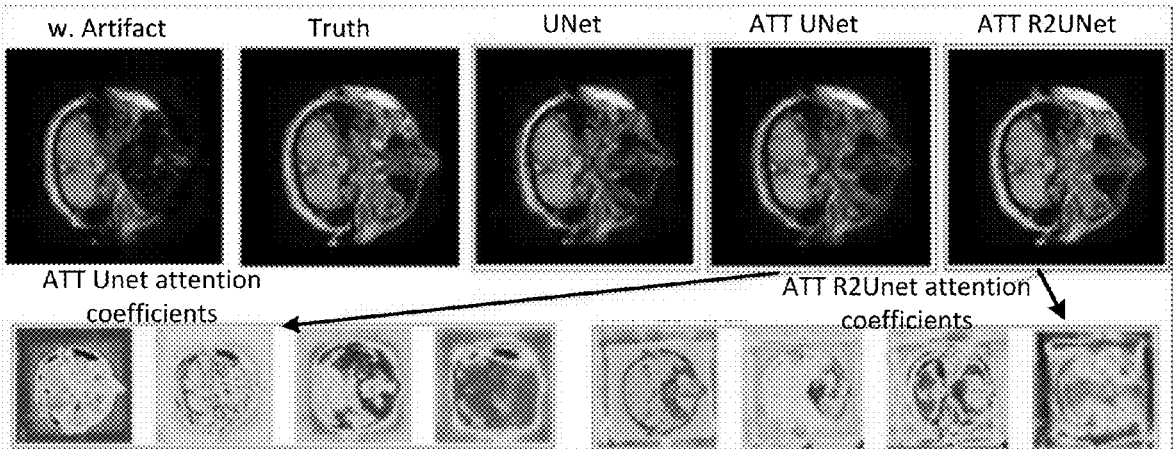

FIGS. 14-16 show example embodiments of test cases for a plurality of model architectures. Each test case includes an image with an artifact as well as a truth image. The truth image may be the image that the artifacted image was generated from. Each test case also includes an image generated by each of a Pix2Pix GAN basic UNet generator model architecture, a Pix2Pix GAN attention UNet generator model architecture, and a Pix2Pix GAN attention R2UNet generator model architecture. Each image additionally includes images of each of ATT Unet attention coefficients and ATT R2UNet attention coefficients of the Pix2Pix GAN attention UNet generator model architecture and the Pix2Pix GAN attention R2UNet generator model architecture, respectively. These attention coefficients may be the top 4 skipped connections that are obtained after the sigmoid function. Because these connections are obtained after the sigmoid function, they may be scaled between 0 and 1.

In at least one example embodiment, the attention coefficients may help to show the focus of a particular model architecture at every level of the model architecture. For example, the attention coefficients show that layers 2 and 3 of the Pix2Pix GAN attention UNet generator model architecture and the Pix2Pix GAN attention R2UNet generator model architecture are focused on the brain. In particular, layers 2 and 3 are focused on areas of the brain where B0 susceptibility artifacts are present. In contrast, the top layer of the Pix2Pix GAN attention UNet generator model architecture and the Pix2Pix GAN attention R2UNet generator model architecture focus mostly on the background including non-zero area around the brain that is generated when the images are rotated. Although depicted with reference to particular neural networks, the methods described herein may be implemented by additional types of neural networks.

Figure 17:
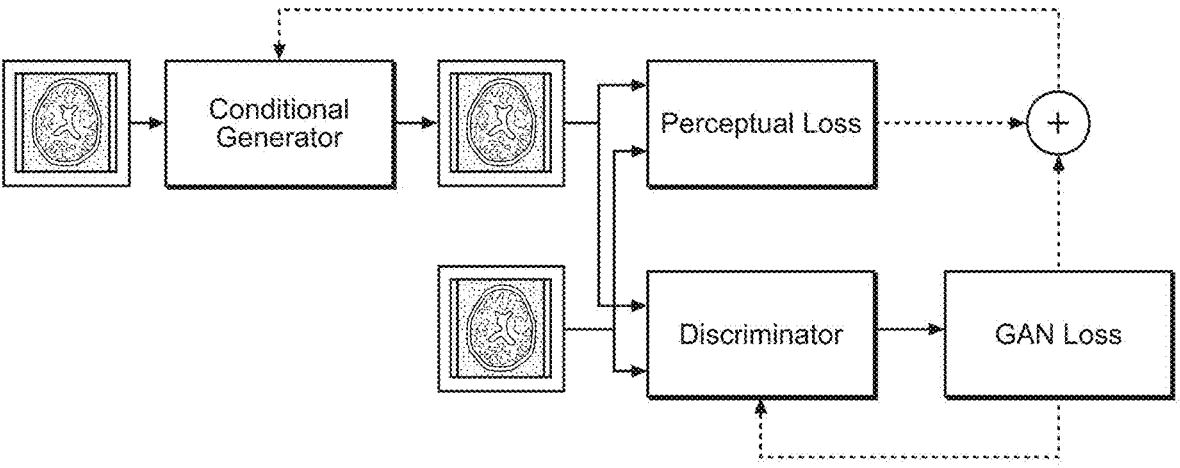
FIG. 17 is a block diagram of an example embodiment of training using both GAN quality loss and perceptual loss.

Referring to FIG. 17, a model architecture with perceptual loss is shown. This model architecture may be designed to help reduce image blurriness. This model architecture may be coupled with the Pix2Pix GAN attention R2UNet generator model architecture in some embodiments. In at least one example embodiment, the model architecture may be coupled to a different neural network.

In some example embodiments, T2 TSE images may be distortion free which may allow the images to be used to help constrain reconstruction by extracting their edge structures. In one example, contour images may be generated using T2 TSE images using a canny edge detector. T2 TSE images may be acquired alongside distorted EPI images in imaging examinations. Thus, the T2 TSE images may be considered as additional available information. A custom implementation of the model architecture with perceptual loss coupled with the Pix2Pix GAN attention R2UNet generator model architecture may be implemented and may benefit from contour images for completing image-to-image translation. Alternatively, different 2D models may be used besides the Pix2Pix GAN attention R2UNet generator model architecture if the amount of memory of required to transform the model into a 3D network is a challenge to manage. In at least one example embodiment, the perceptual loss model architecture can alternatively use other types of distortion-free images in place of the T2 TSE images described above.

For any of the above-described model architectures, testing may be completed to evaluate the models. In at least one example embodiment, performance metrics used to evaluate the model architectures may include a structural similarity index measure (SSIM), DICE coefficient, mean absolute error (MAE), peak signal-to-noise ratio (PSNR), or Fréchet Inception Distance (FID). One or more of these performance metrics may be used to compare performance of at least one of the trained models as well as performance under varying levels of artifact severity in the EPI images. In at least one embodiment, hyperparameter tuning, ablation studies, and failure analysis may additionally be implemented to find limitations of any of the models. These methods may introduce each artifact with different degrees of severity until a performance drop is observed.

In at least one example embodiment, the trained models may be tested to determine whether they alter diffusion MRI measurements. For example, clinical validity of synthetic images may be compared to DWI and DTI data from brain tumors and stroke patients to determine alterations to ADC measurements, structural connectivity, and fiber tract geometry from the original image data. Additionally, each of the trained models may be tested to determine whether their impact alters fMRI measurements. For example, fMRI data may be used to compare functional connectivity metrics in patients with brain tumors and chronic pain to determine whether the selected model alters the functional connectivity metrics. The trained models may additionally be tested to determine their impact on whether they alter DSC perfusion measurements. For example, DSC perfusion data may be examined to determine whether a model alters cerebral blood volume and flow in the whole brain as well as in other regions of interest to pathology in a set of patients with brain tumors and stroke.

Although the present invention has been described in detail with reference to example embodiments, the present invention is not limited by the disclosed examples from which the skilled person is able to derive other variations without departing from the scope of the invention.

None of the elements recited in the claims are intended to be a means-plus-function element within the meaning of 35 U.S.C. § 112 (f) unless an element is expressly recited using the phrase "means for" or, in the case of a method claim, using the phrases "operation for" or "step for."

The terminology used herein is for the purpose of describing particular embodiments only and is not intended to be limiting of example embodiments. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific structural and functional details disclosed herein are merely representative for purposes of describing example embodiments. This invention may, however, be embodied in many alternate forms and should not be construed as limited to only the embodiments set forth herein.

Units and/or devices according to one or more example embodiments may be implemented using hardware, software, and/or a combination thereof. For example, hardware devices may be implemented using processing circuitry such as, but not limited to, a processor, at least one central processing unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

For example, when a hardware device is a computer processing device (e.g., a processor, Central At least one processor (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special-purpose computer processing device. In a more specific example, when the program code is loaded into a processor, the processor becomes programmed to perform the program code and operations corresponding thereto, thereby transforming the processor into a special-purpose processor. According to one or more example embodiments, at least one memory may include or store computer program code, and the at least one memory and the computer program code may be configured to, with at least one processor, cause an information processing device and/or an acquisition device to perform the necessary tasks. Additionally, the processor, memory and example algorithms, encoded as computer program code, serve as means for providing or causing performance of operations discussed herein.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher-level program code that is executed using an interpreter.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer-readable recording mediums, including the tangible or non-transitory computer-readable storage media discussed herein.

Even further, any of the disclosed methods may be embodied in the form of a program or software. The program or software may be stored on a non-transitory computer-readable medium and is adapted to perform any one of the aforementioned methods when run on a computer device (a device including a processor). Thus, the non-transitory, tangible computer-readable medium, is adapted to store information and is adapted to interact with a data processing facility or computer device to execute the program of any of the above mentioned embodiments and/or to perform the method of any of the above-mentioned embodiments.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method of correcting echo planar imaging artifacts, the method comprising:

correcting, using a trained neural network, at least one echo planar imaging artifact in an image to obtain a corrected image, wherein the trained neural network is trained using a dataset of artifacted echo planar images, the dataset of artifacted echo planar images includes high-resolution images that have been generated by an imaging process other than echo planar imaging and modified to include at least one first simulated echo planar imaging artifact, and the at least one first simulated echo planar imaging artifact is at least one of a simulated B0 susceptibility artifact, a simulated chemical shift artifact, a simulated Rician noise artifact, a simulated Nyquist artifact, or a simulated Gibbs ringing artifact.

2. The method of claim 1, wherein the image is obtained through echo planar imaging.

3. The method of claim 1, wherein the dataset of artifacted echo planar images further includes at least one artifacted image with at least one second simulated echo planar imaging artifact.

4. The method of claim 1, wherein the dataset of artifacted echo planar images further includes at least one artifacted image with at least one deliberately induced echo planar imaging artifact generated by altering imaging equipment.

5. The method of claim 1, wherein the at least one echo planar imaging artifact includes at least one of a B0 susceptibility artifact, a chemical shift artifact, a Rician noise artifact, a Nyquist artifact, or a Gibbs ringing artifact.

6. A method of training a neural network to correct single-shot echo planar imaging artifacts, the method comprising:

inputting a dataset of artifacted single-shot echo planar images into a neural network, each artifacted echo planar image including at least one synthetic echo planar imaging artifact;

modifying, via the neural network, each image of the dataset of artifacted single-shot echo planar images to remove the at least one synthetic echo planar imaging artifact; and updating one or more parameters of the neural network based on the modified images of the dataset of artifacted single-shot echo planar images, wherein the dataset of artifacted single-shot echo planar images includes high-resolution images that have been generated by an imaging process other than echo planar imaging and modified to include the at least one synthetic echo planar imaging artifact and the at least one synthetic echo planar imaging artifact is at least one of a simulated B0 susceptibility artifact, a simulated chemical shift artifact, a simulated Rician noise artifact, a simulated Nyquist artifact, or a simulated Gibbs ringing artifact.

7. The method of claim 6, further comprising:

validating the neural network with a validation dataset of artifacted single-shot echo planar images, each artifacted single-shot echo planar image, in the validation dataset of artifacted single-shot echo planar images, including at least one synthetic echo planar imaging artifact.

8. The method of claim 6, wherein the at least one synthetic echo planar imaging artifact includes at least one of a B0 susceptibility artifact, a chemical shift artifact, a Rician noise artifact, a Nyquist artifact, or a Gibbs ringing artifact.

9. The method of claim 6, wherein the neural network is trained using a combination of supervised and unsupervised learning.

10. The method of claim 6, wherein the neural network employs at least one of a generative adversarial network (GAN) multiscale generator model architecture, a GAN multiscale generator with attention architecture, a GAN multiscale generator model with attention architecture, or a GAN generator model with attention and with recurrent convolutional layers architecture.

11. The method of claim 10, wherein the neural network is trained to minimize at least one of a discriminative loss, a Wasserstein loss, or a loss computed using a pretrained model.

12. The method of claim 6, wherein the neural network is trained with an iterative fine-tuning approach.

* * * * *